US012669961B2

(12) United States Patent
Francisco et al.

(10) Patent No.: US 12,669,961 B2
(45) Date of Patent: Jun. 30, 2026

(54) COORDINATING ESTABLISHMENT OF SOURCE AND TARGET COPY RELATIONSHIPS ON PRIMARY AND SECONDARY SERVERS

(71) Applicant: INTERNATIONAL BUSINESS MACHINES CORPORATION, Armonk, NY (US)

(72) Inventors: Nedlaya Yazzie Francisco, Tucson, AZ (US); Theresa Mary Brown, Tucson, AZ (US); Gregory Edward McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 18/059,191

(22) Filed: Nov. 28, 2022

(65) Prior Publication Data

US 2024/0176538 A1    May 30, 2024

(51) Int. Cl.
    *G06F 3/06*            (2006.01)
(52) U.S. Cl.
    CPC ............ *G06F 3/0659* (2013.01); *G06F 3/065* (2013.01); *G06F 3/0604* (2013.01); *G06F 3/067* (2013.01)
(58) Field of Classification Search
    CPC ........ G06F 3/065; G06F 3/0659; G06F 3/067; G06F 3/0604
    See application file for complete search history.

(56) References Cited

U.S. PATENT DOCUMENTS

| | | | |
|---|---|---|---|
| 10,437,679 B2 | 10/2019 | Brown et al. | |
| 2015/0378854 A1* | 12/2015 | Hatfield .............. | G06F 11/2058 |
| | | | 714/6.3 |
| 2018/0143766 A1 | 5/2018 | Brown et al. | |
| 2018/0321848 A1* | 11/2018 | Brown ................ | G06F 11/2064 |

OTHER PUBLICATIONS

B. Dufrasne et al., "IBM System Storage DS8000:Remote Pair FlashCopy (Preserve Mirror)", IBM Corporation, REDP-4504-00, May 2009, 56 pp.
B. Dufrasne et al., "IBM DS8000 Copy Services: Updated for IBM DS8000", IBM Corporation, SG24-8367-01, Apr. 2021, 626 pp.

* cited by examiner

*Primary Examiner* — Eric Cardwell
(74) *Attorney, Agent, or Firm* — Konrad Raynes Davda & Victor LLP; David Victor

(57)            ABSTRACT
Provided are a computer program product, system, and method for coordinating establishment of source and target copy relationships on primary and secondary servers. A command is received to establish a primary copy relationship of primary source data in the primary storage to copy to primary target data in the primary storage and a secondary copy relationship of secondary source data in the secondary storage to copy to secondary target data in the secondary storage. A determination is made as to whether a part of the secondary target data in a secondary pre-existing copy relationship at the secondary storage can be withdrawn from the secondary pre-existing copy relationship. In response to determining that the part of the secondary target data in the secondary pre-existing copy relationship can be withdrawn, establishing the primary copy relationship for the primary storage and establishing the secondary copy relationship for the secondary storage.

20 Claims, 6 Drawing Sheets

Point-in-Time Copy Relationship

Mirror Copy Relationship

700

COORDINATING ESTABLISHMENT OF SOURCE AND TARGET COPY RELATIONSHIPS ON PRIMARY AND SECONDARY SERVERS

1. FIELD OF THE INVENTION

The present invention relates to a computer program product, system, and method for coordinating establishment of source and target copy relationships on primary and secondary servers.

2. DESCRIPTION OF THE RELATED ART

Data backup systems provide continuous availability of production data in the event of a sudden catastrophic failure at a single point in time or data loss over a period of time. In one such disaster recovery system, production data is replicated from a source storage system to a target storage system. Different data replication technologies may be used for maintaining remote copies of data at a target site, such as International Business Machine Corporation's ("IBM") Metro Mirror Peer to Peer Remote Copy (PPRC), Extended Remote Copy (XRC), Coupled XRC (CXRC), Global Copy, and Global Mirror, and FlashCopy®, which is a type of point-in-time or snapshot copy operation.

On the IBM DS8000® storage server in a PPRC configuration, a Remote Pair FlashCopy (RPFC) function operates by establishing a local point-in-time copy, also known as a FlashCopy, to copy data in a local source volume to a local target volume in a local storage server and establishing a remote point-in-time copy to copy data in a remote source volume to a remote target volume in a remote storage server. Also, a first mirror volume pair is established between the local source volume and the remote source volume to mirror data from the local source volume to the remote source volume. Further, a second mirror volume pair is established between the local target volume and the remote target volume to mirror data from the local target volume to the remote target volume. In this way, point-in-time copy operations occur to volumes being mirrored. When a FlashCopy® (FLC) establish command is issued with a RPFC option, the user is allowed to specify Start Background Copy (BGC), No BGC, Persistent or Non-Persistent, Dataset, Full volume or Incremental FLC relations. Once RPFC validation is completed on the PPRC primary server, the FLC relation is created on the PPRC primary server. Next, using in-band commands, an in band FLC establish command is sent to the PPRC secondary server to create the same FLC relationship. Once the FLC relationships are created successfully on both the PPRC primary and secondary servers, then the FLC establish command returns success back to the user. (Flash-Copy, IBM, and DS8000 are trademarks of IBM throughout the world).

An FLC withdraw procedure to remove tracks in the new FLC is handled differently. When a FLC withdraw command is issued, the first step on the PPRC primary server is to find all the pre-existing FLC relations within specified parameters of the FLC withdraw command (i.e., source volume specified, extents specified or if full volume is specified). Once a pre-existing FLC relation is found that is also an RPFC relation, the primary the PPRC relation is processed. Then an in-band FLC withdraw command is sent to the PPRC secondary server to process the RPFC relation.

There is a need in the art for improved techniques for establishing relationships on primary and secondary servers involved in a copy relationship.

SUMMARY

Provided are a computer program product, system, and method for coordinating establishment of source and target copy relationships on primary and secondary servers. A command is received to establish a primary copy relationship of primary source data in the primary storage to copy to primary target data in the primary storage and a secondary copy relationship of secondary source data in the secondary storage to copy to secondary target data in the secondary storage. A determination is made as to whether a part of the secondary target data in a secondary pre-existing copy relationship at the secondary storage can be withdrawn from the secondary pre-existing copy relationship. In response to determining that the part of the secondary target data in the secondary pre-existing copy relationship can be withdrawn, establishing the primary copy relationship for the primary storage and establishing the secondary copy relationship for the secondary storage.

DETAILED DESCRIPTION

In current implementations, if a user specifies a Remote Pair Flash Copy (RPFC) dataset, with no BGC and non-persistent FLC relation in a FLC establish command, and the PPRC primary and secondary boxes are configured differently, the cache algorithm could behave differently on the PPRC primary and secondary servers. As a result, on the PPRC primary server, the RPFC relation on the primary server is removed because all the source data on the PPRC primary server is copied to the PPRC secondary server. However, on the PPRC secondary, the RPFC relation may only copy some of the source data to the target storage. This may result in a situation where there is no copy relationship on the primary server, but the (RPFC) copy relationship remains on the secondary server.

The customer when noticing the remaining copy relationship on the secondary server may try manually to clean-up any remaining copy relationship by sending an FLC withdraw command to the PPRC primary server. If there is no RPFC copy relation on the primary server, no FLC withdraw will be sent to the PPRC secondary server. In such case, the FLC withdraw command returns successful, and the customer believes the RPFC relations are removed, when in fact a pre-existing copy relationship still remains on the secondary server. When the customer tries to issue another RPFC establish command to the same target tracks the command fails because of the remaining copy relationship, requiring the customer to engage in further FLC withdraw operations on the PPRC secondary server. The customer will need to remove the RPFC relations on the PPRC secondary. They either issue a FLC withdraw, which may be difficult if the customer does not have a direct connection to the PPRC secondary or seek customer support.

Described embodiments provide improvements to computer technology for automatically coordinating the establishment of source and target point-in-time copy relationships on the primary and secondary storage servers for a new copy relationship involving primary and secondary storage servers. With described embodiments, the withdrawal of data in the new copy relationship from any pre-existing copy relationships are incorporated into the establishment procedure to automatically withdraw any data from pre-existing copy relationships, if necessary and possible, to allow the new copy relationship to be established on both the primary and secondary storage servers in a manner that does not require user intervention and support.

Figure 1:
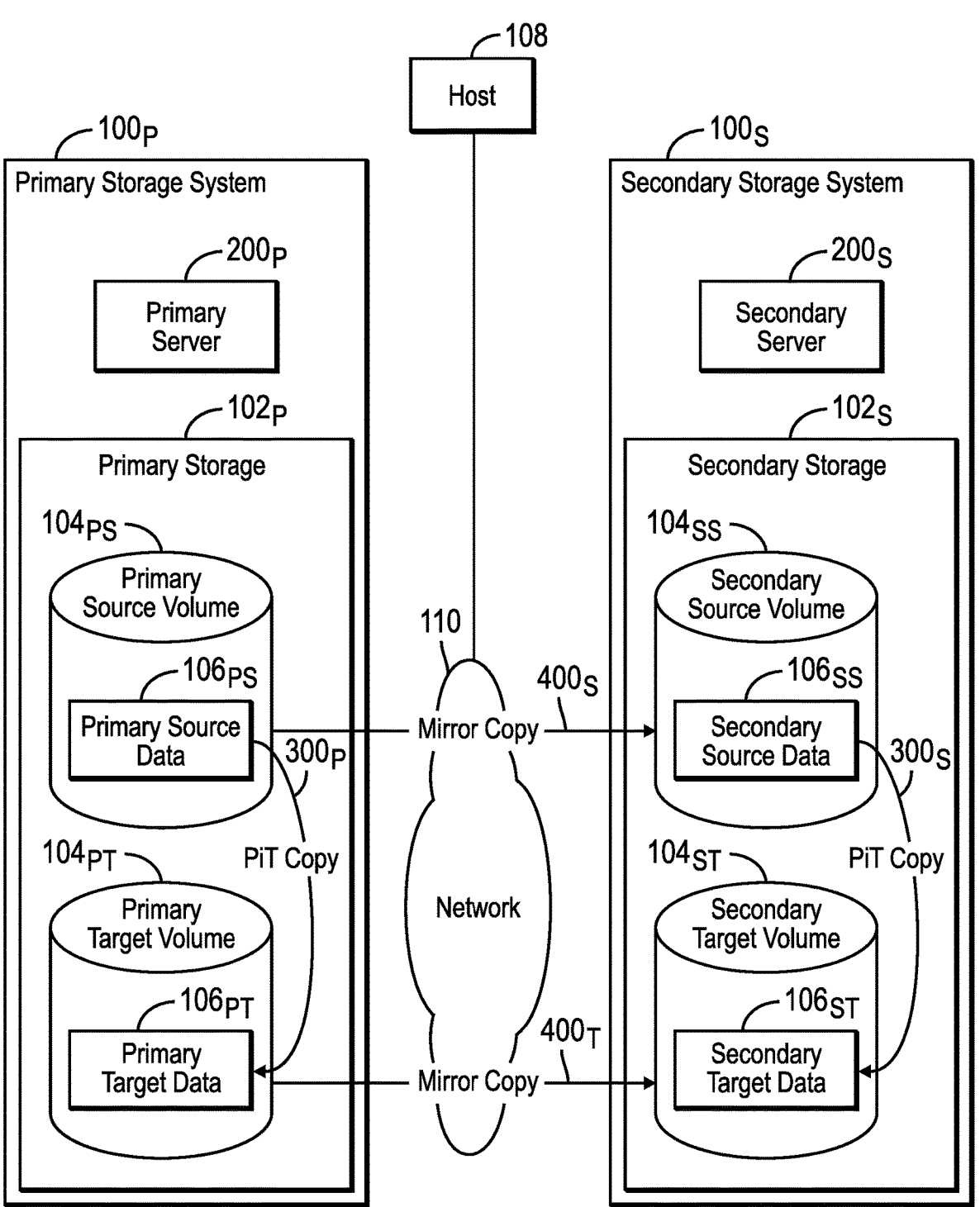
FIG. 1 illustrates an embodiment of a data replication environment.

FIG. 1 illustrates an embodiment of a data replication environment having a primary storage system $100_P$ including a primary server $200_P$ managing access to a primary storage $102_P$ and a secondary storage system $100_S$ managing access to a secondary storage $102_S$. The primary storage $102_P$ includes a primary source volume $104_{PS}$ having primary source data $106_{PS}$ that is in a primary point-in-time copy relationship $300_P$ with primary target data $106_{PT}$ in a primary target volume $104_{PT}$. The secondary storage $102_S$ includes a secondary source volume $104_{SS}$ having secondary source data $106_{SS}$ that is in a secondary point-in-time copy PiT relationship $300_S$ with a secondary target data $106_{ST}$ in a secondary target volume $104_{ST}$. In addition to the point-in-time (PiT) copy relationships $300_P$, $300_S$, a source mirror copy relationship $400_S$ is established to mirror the primary source volume $104_{PS}$ to the secondary source volume $104_{SS}$ and a target mirror copy relationship $400_T$ is established to mirror the primary target volume $104_{PT}$ to the secondary target volume $104_{ST}$.

The architecture of FIG. 1 represents a mirror point-in-time copy relationship having both point-in-time copy relationships 300 and mirror copy relationships 400. One example of a mirror point-in-time copy relationship is the IBM Remote Pair Flash Copy relationship. This architecture may be implemented in copy services from other vendors.

One or more hosts 108 may direct I/O requests to the primary storage system $100_P$ or secondary storage system $100_S$ over network 110, where the primary storage system $100_P$ may comprise a production storage to which most I/O requests are directed, and the secondary storage system $100_S$ is used mostly for providing a backup copy in case of a failover. The source and target data $106_{PS}$, $106_{PT}$, $106_{SS}$, $106_{ST}$ may comprise a portion of the volume $104_{PS}$, $104_{PT}$, $104_{SS}$, $104_{ST}$, respectively, in which they are included, such as one or more data sets, extents, chunks, etc., or may comprise the entire volume.

The point-in-time copy relationships $300_P$, $300_S$ may comprise point-in-time copy relationships to copy over primary/secondary source data to corresponding primary/secondary target data before the data is updated, so that the primary/secondary target volume stores data as of a point-in-time the point-in-time copy relationship was established. Examples of point-in-time copies include snapshot copies and FlashCopy®. Examples of mirror copies include IBM Metro Mirror Peer to Peer Remote Copy (PPRC) and Extended Remote Copy (XRC).

The term "storage system" as used herein may refer to a storage server $200_P$, $200_S$ and/or the storages $102_P$, $102_S$ managed by the server. The term "server" or "storage server" may be used to refer to the servers $200_P$, $200_S$.

The servers $200_P$ and $200_S$ may comprise enterprise class storage servers, such as the IBM DS8000® storage server, or storage controllers and storage systems from other vendors. The host operating system 108 may comprise an operating system such as Z Systems Operating System (Z/OS®) from International Business Machines Corporation ("IBM") or operating systems from other vendors. (Z/OS is a registered trademark of IBM throughout the world). Host and storage server systems/storage controllers from other vendors may also be used.

The storages $102_P$, $102_S$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes in the storages $102_P$, $102_S$ may further be configured from an array of devices, such as Just a Bunch of Disks (JBOD), Direct Access Storage Device (DASD), Redundant Array of Independent Disks (RAID) array, virtualization device, etc. Further, the storages $102_P$, $102_S$ may comprise heterogeneous storage devices from different vendors and different types of storage devices, such as a first type of storage devices, e.g., hard disk drives, that have a slower data transfer rate than a second type of storage devices, e.g., SSDs.

The network 110 used by the storage systems $100_P$ and $100_S$ to copy data and commands may comprise a storage network such as one or more interconnected Local Area Networks (LAN), Storage Area Networks (SAN), Wide Area Network (WAN), peer-to-peer network, wireless network, the Internet, etc. The network 110 may further include in-band communication channels between the storage systems $100_S$ and $100_T$ for the mirror copy operations. The mirror copies $400_P$, $400_S$ may copy data in full duplex mode.

Figure 2:
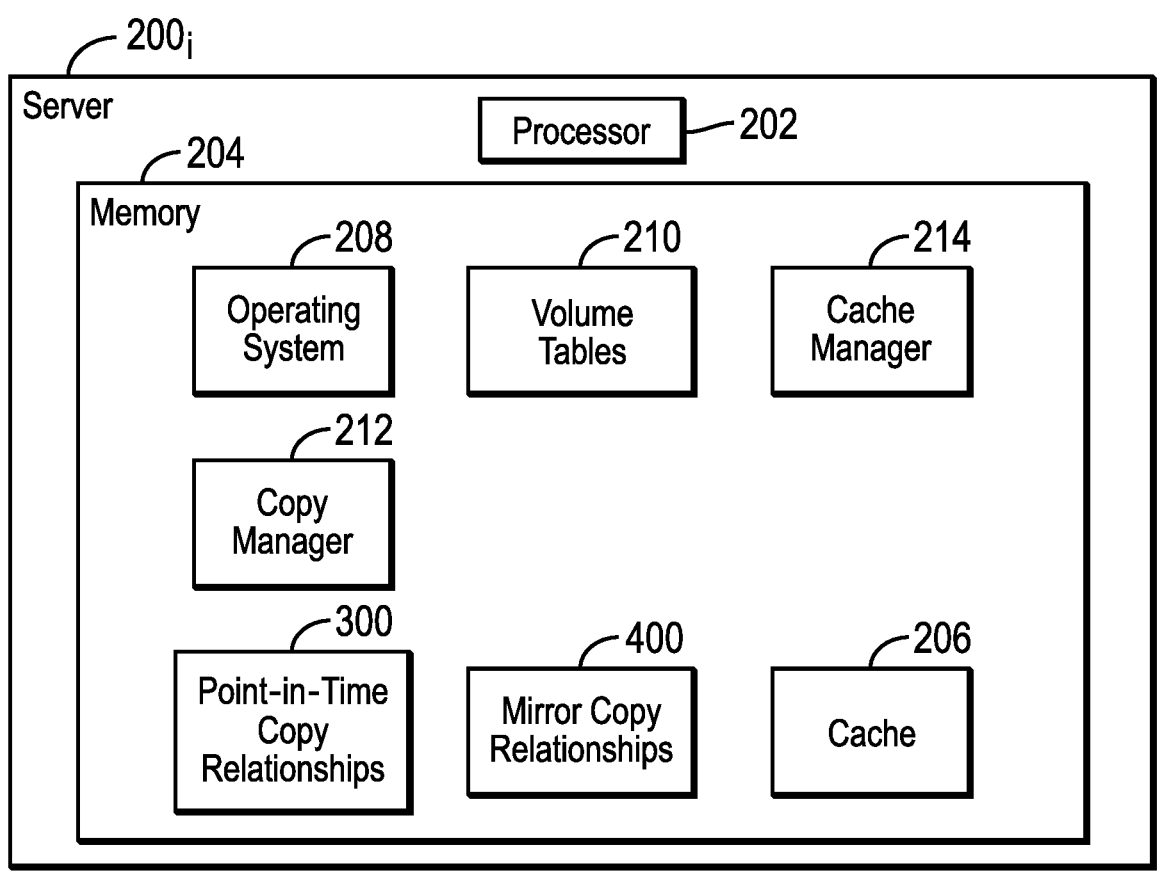
FIG. 2 illustrates an embodiment of components in a server in the replication environment of FIG. 1.

FIG. 2 provides an embodiment of components of a server $200_i$ involved in data mirroring, such as the primary server $200_P$ and secondary server $200_S$. The server $200_i$ includes a processor 202 and a memory 204 including programs executed by the processor 202 as well as a cache 206 to cache read and write data for the primary storage $102_P$. A portion of the cache 206 may also be used to mirror and copy data in a copy relationship to the secondary system $100_S$. The memory 204 includes an operating system 208, which configures and manages volumes in attached storage and maintains volume tables 210, such as a volume table of contents (VTOC), file allocation table, etc., providing information on the configured volumes $104_i$. The operating system 208 further manages I/O requests with respect to the volumes $104_i$.

The memory 204 includes a copy manager 212 providing copy services to create and manage point-in-time copy relationships 300 and mirror copy relationships 400. The server $200_i$ further includes a cache manager 214 to manage tracks in volumes 104 that are stored in the cache 206 and determine when to demote tracks from cache to free space in the cache.

The program components in the memory 204, including 208, 212, 214 are shown in FIG. 2 as program code loaded into the memory 204 and executed by the processor 202. Alternatively, some or all of the components functions may be implemented in hardware devices, such as in Application Specific Integrated Circuits (ASICs), Field Programmable Gate Array (FPGA) or executed by separate dedicated processors.

The memory 204 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

Figure 3:
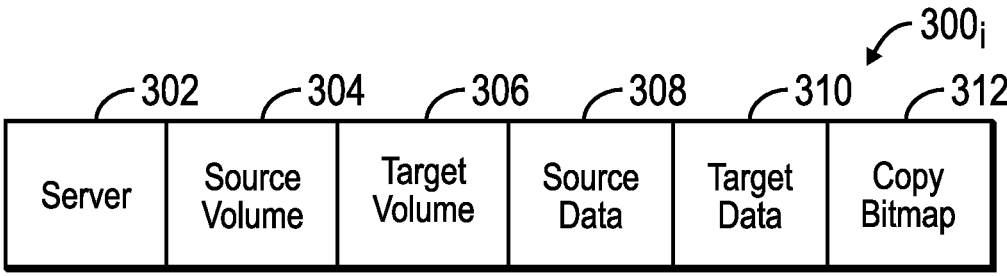
FIG. 3 illustrates an embodiment of a point-in-time copy relationship to copy source data to target data.

FIG. 3 illustrates an embodiment of an instance of a point-in-time copy relationship 300 indicating a server 302, e.g., $200_P$, $200_S$ at which the relationship is established, source volume 304, target volume 306, source data 308 in the source volume 304, target data 310 in the target volume 306, and a copy bitmap 312 indicating units, e.g., tracks, of data in the source data 308 that need to be copied to the target data 310. A bitmap 310 bit is set to indicate point-in-time data to copy from the source data 308 to the target data 310 when the point-in-time data is about to be updated with new data, to preserve the point-in-time data in the source volume 304 at the source 308 before being updated in the target data 310 in the target volume 306. The bit is reset to indicate no copy when the point-in-time data is copied to the target data 310. The data 308, 310 may comprise a portion of the volume 304, 306 in which it is included, such as one or more data sets, extents, chunks, etc., or may comprise the entire volume.

Figure 4:
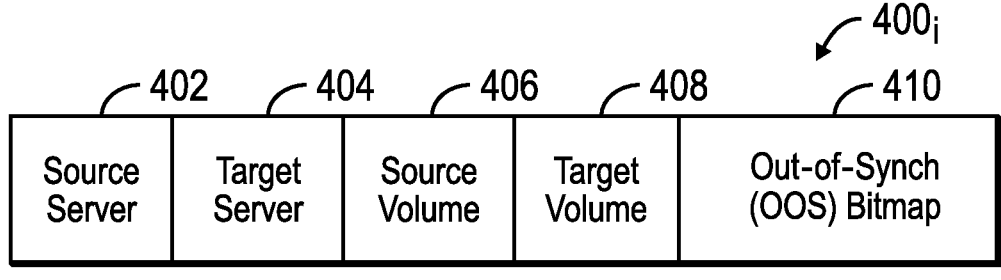
FIG. 4 illustrates an embodiment of a mirror copy relationship to mirror a primary volume to a secondary volume.

FIG. 4 illustrates an embodiment of an instance of a mirror copy relationship $400_i$ indicating a source server 402, target server 404, a source volume 406 in the source server 402 to mirror to a target volume 408 in the target server 404, and an out-of-synch (OOS) bitmap 410. The OOS bitmap 410 includes a bit for each data unit, e.g., track, in the source volume 406 to mirror to the target volume 408, and is reset when the data unit is mirrored. The data may be mirrored in full duplex mode.

Figure 5A:
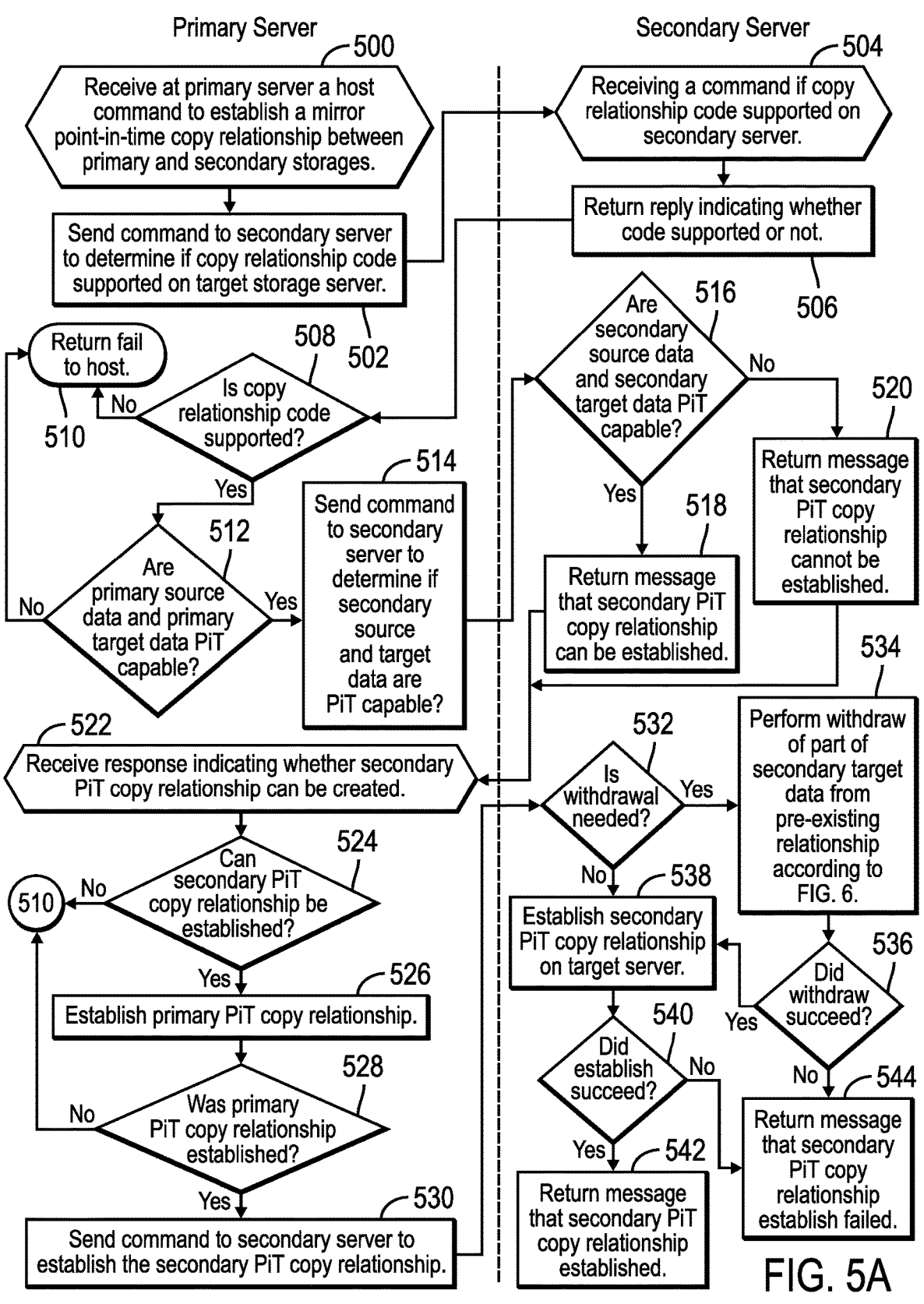
FIGS. 5A and 5B illustrate an embodiment of operations to establish copy relationships for a mirror point-in-time copy relationship.
Figure 5B:
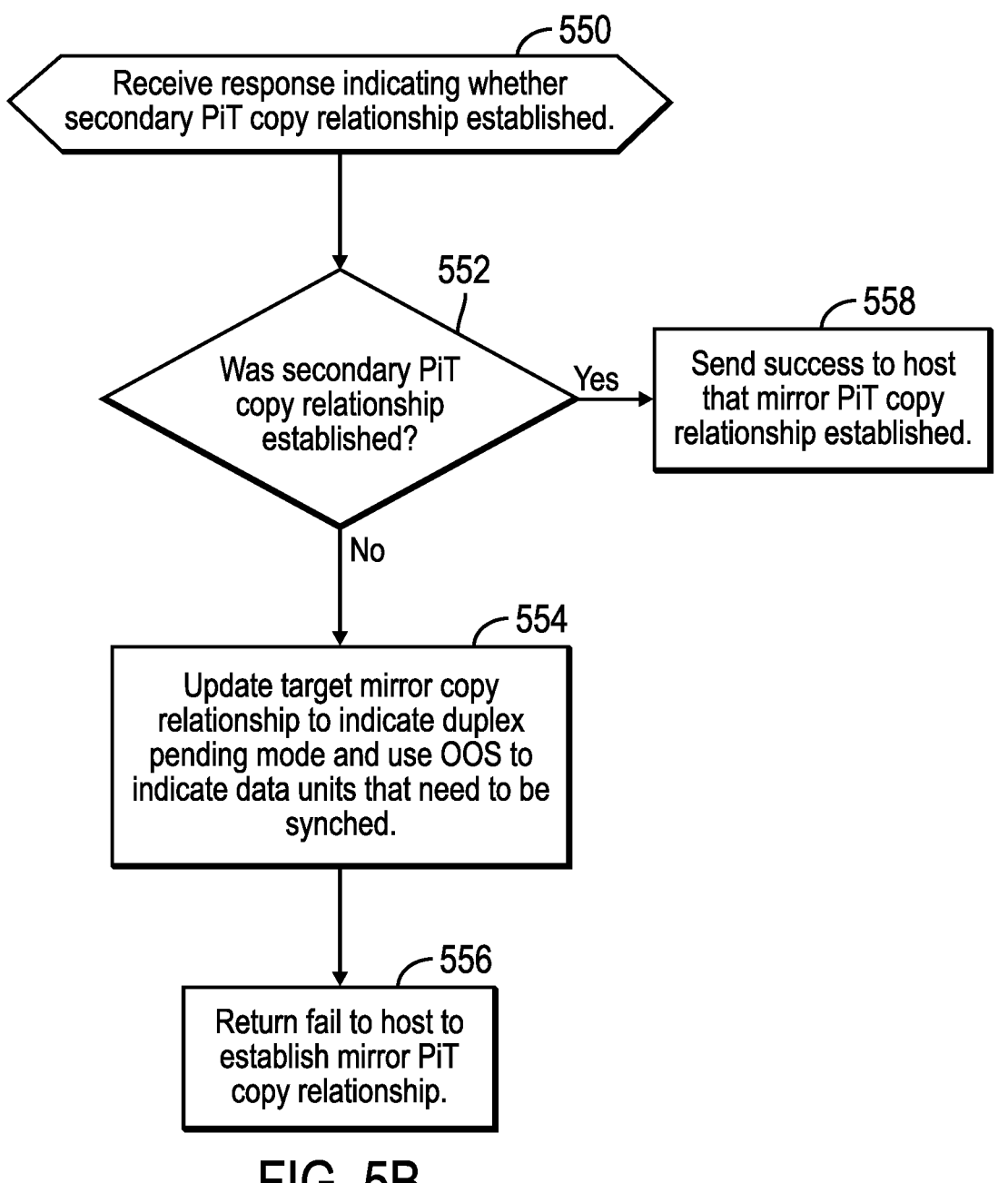

FIGS. 5A and 5B illustrate an embodiment of operations performed by the primary copy manager $212_P$ and secondary copy manager $212_S$ at the primary server $200_P$ and the secondary server $200_S$, respectively, to establish a mirror point-in-time copy relationship requested by the host 108. In certain embodiments, the source $400_S$ and the target $400_T$ mirror copy relationships exist in full duplex mode before the point-in-time copy relationships $300_P$ and $300_S$ are established. Upon the primary server $200_P$ receiving (at block 500) a command from the host 108 to establish a mirror point-in-time copy relationship, e.g., RPFC, that specifies the source and target volumes, source and target servers, and source and target data, the primary copy manager $212_P$ sends (at block 502) a command to the secondary server $200_S$ to determine if the necessary copy relationship code, or copy manager version, is supported on the secondary server $200_S$ to perform the necessary operations Upon the secondary server $200_S$ receiving (at block 504) the command inquiring if copy relationship code is supported, the secondary server $200_S$ returns (at block 506) a reply indicating whether or not the secondary server $200_S$ includes the code needed to establish the necessary copy relationships for the host 108 command.

Upon receiving the returned reply at the primary copy manager $212_P$, if (at block 508) the copy relationship code is not supported, fail is returned (at block 510) to the host 108 request. Otherwise, if (at block 508) copy relationship code is supported on the secondary server $200_S$, then the primary copy manager $212_P$ determines (at block 512) whether the primary source data $106_{PS}$ and primary target data $106_{PT}$ are point-in-time (PiT) capable. If (at block 512) the primary source data $106_{PS}$ and primary target data $106_{PT}$ are point-in-time (PiT) capable, then the primary copy manager $212_P$ sends (at block 514) a command to the secondary server $200_S$ to determine if the point-in-time copy relationship $300_S$ can be established on the secondary server $200_S$, i.e., the secondary source and target data are PiT capable. If (at block 512) the primary source data $106_{PS}$ and primary target data $106_{PT}$ are not point-in-time capable, then fail is returned (at block 510) to the host 108.

Data may be PiT capable of functioning as the source data in a point-in-time copy relationship if: the source data is or is not in a pre-existing point-in-time copy relationship; the source data is both a source and a target of another pre-existing point-in-time copy relationship, i.e., in cascaded relationship. Data may not be capable of functioning as the source data in a point-in-time copy relationship if: the source data comprises incremental data.

Data may be capable of functioning as the target data in a point-in-time relationship if: the target data is not in a pre-existing point-in-time copy relationship; the target data is in a pre-existing point-in-time copy relationship and can be withdrawn from the pre-existing point-in-time copy relationship. Data may not be capable of functioning as the target source data in a point-in-time relationship if: the target data comprises incremental data; the target data is in a pre-existing point-in-time copy relationship and cannot be withdrawn from the pre-existing point-in-time copy relationship; the target data is both a source and a target of another pre-existing point-in-time copy relationship, i.e., in a cascaded relationship.

Upon the secondary server $200_S$ receiving the command sent at block 514, the secondary copy manager $212_S$ determines (at block 516) whether the secondary source data $106_{SS}$ and the secondary target data $106_{ST}$ are point-in-time capable. If they both are point-in-time capable, then a message is returned (at block 518) to the primary sever $200_P$ that the secondary point-in-time copy relationship $300_S$ can be established. If (at block 516) the secondary source data $106_{SS}$ and the secondary target data $106_{ST}$ are not both point-in-time capable, then a message is returned (at block 520) to the primary server $200_P$ that the secondary point-in-time copy relationship cannot be established. Upon the primary server $200_P$ receiving (at block 522) the response indicating that the second point-in-time copy relationship $300_S$ can be established, if (at block 524) the relationship $300_S$ can be established, then the primary copy manager $212_P$ establishes (at block 526) the primary point-in-time copy relationship $300_P$ from the primary source data $106_{PS}$ to the primary target data $106_{PT}$. If (at block 528) the primary point-in-time copy relationship cannot (at block 524) or is not (at block 528) established, then fail is returned (at block 510) to the host 108. If (at block 528) the primary point-in-time copy relationship $300_P$ is established, then the primary copy manager $212_P$ sends (at block 530) a command to the secondary sever $200_S$ to establish (at block 530) the secondary copy relationship $300_S$.

7

8

Figure 6:
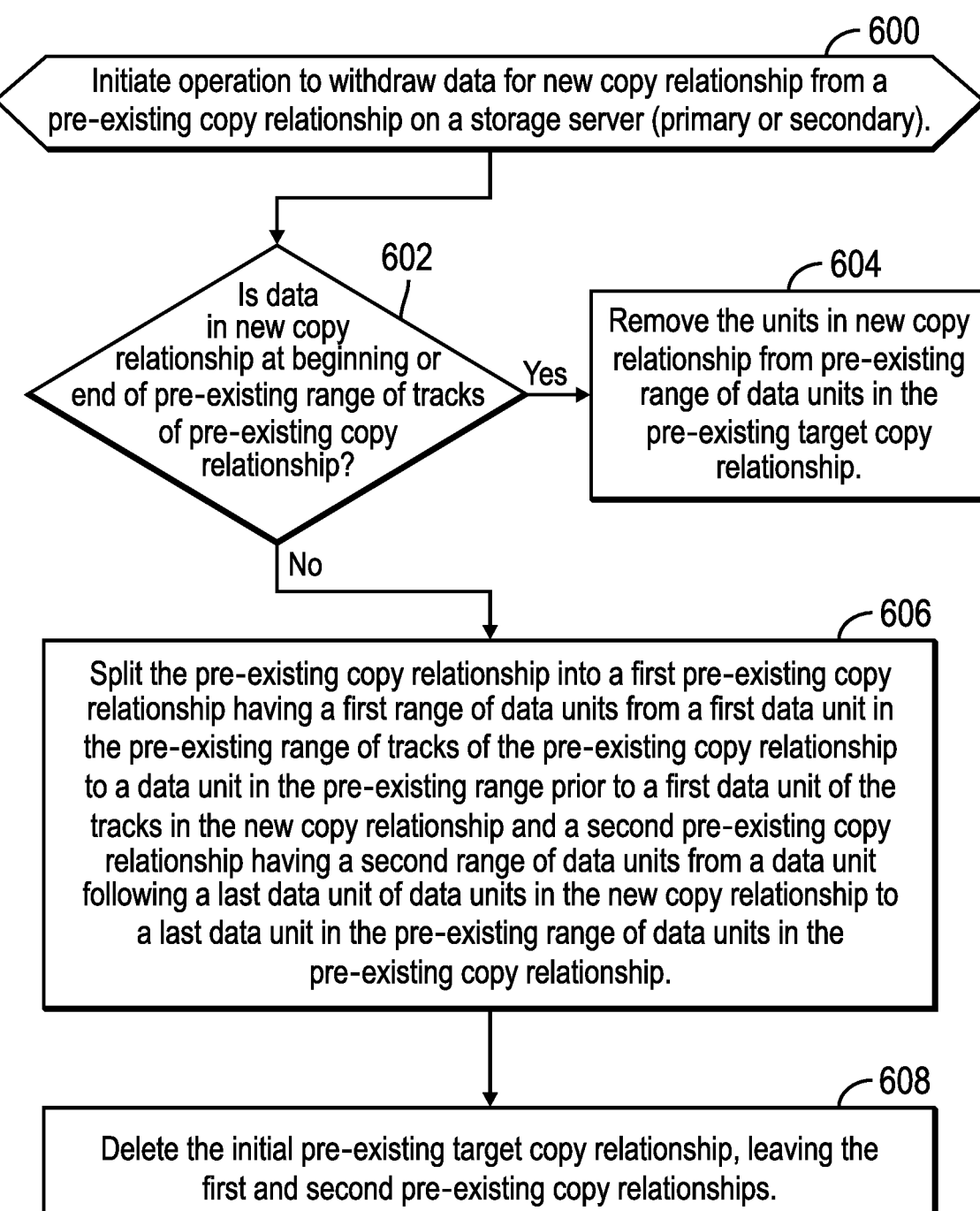
FIG. 6 illustrates an embodiment of operations to withdraw data units in a new copy relationship from a pre-existing copy relationship.

Upon the secondary server $200_S$ receiving the establish command, if (at block 532) is withdrawal is needed, such as if the secondary target data $106_{ST}$ is in a non-cascading pre-existing copy relationship and not incremental data, then the secondary copy manager $212_S$ performs (at block 534) a withdraw of the part, i.e., a subset or all, of the secondary target data $106_{ST}$ that is in, i.e., overlaps, target tracks in a secondary pre-existing target copy relationship $300_{SP}$, such as according to the withdraw operations of FIG. 6. If the secondary target data is in multiple secondary pre-existing copy relationships, then this withdraw may be performed for each secondary pre-existing relationships for which a withdraw can be performed. If (at block 536) the withdrawal of the target data succeeded or if (at block 532) withdrawal is not needed, then the secondary copy manager $212_S$ establishes (at block 538) the secondary point-in-time copy relationship $300_S$ from the secondary source data $106_{SS}$ to the secondary target data $106_{ST}$. If (at block 540) the establish succeeded, a message is returned (at block 542) to the primary server $200_P$ indicating that the secondary point-in-time copy relationship $300_S$ was established. Otherwise, if (at block 540) establish failed or if (at block 536) withdraw failed, then a message is returned (at block 544) to the primary server $200_P$ indicating that the secondary point-in-time copy relationship $300_S$ failed.

FIG. 5B illustrates an embodiment of operations performed by the primary copy manager $212_P$ to proceed after the secondary server $200_S$ establishes the secondary point-in-time copy relationship $300_S$. Upon receiving (at block 550) a response from the secondary server $200_S$ indicating whether the secondary point-in-time copy relationship $300_S$ was established, if (at block 552) the secondary point-in-time copy relationship $300_S$ was not established, then the target mirror copy relationship $400_T$ is updated to indicate it is in duplex pending mode and the OOS 410 is used to indicate data units that need to be synched from the primary site to the secondary site. This shows the primary target volume $104_{PT}$ is out-of-synch with the secondary target volume $104_{ST}$. Fail is returned (at block 556) to the host 108. If (at block 552) the secondary point-in-time copy was established, then success is returned (at block 558) to the host 108 to indicate the requested mirror point-in-time copy relationship was established. Upon success, the mirror copy relationships $400_S$ and $400_T$ remain full duplex and the OOS 410 is not updated or changed.

The embodiment of FIGS. 5A and 5B provides operations to minimize the communications between a primary server $200_P$ and secondary server $200_S$ to establish a new mirror point-in-time copy, such as a RPFC copy relationship on both the primary $200_P$ and secondary $200_S$ servers. In the described embodiments, the primary server $200_P$ requests from the secondary server $200_S$ whether the secondary server $200_S$ can establish a secondary point-in-time copy relationship $300_S$, including whether the target tracks in the new secondary copy relationship $300_S$ can be withdrawn if some of the target tracks are in a secondary pre-existing copy relationship $300_{SP}$ on the secondary server $200_S$. With the described embodiment, the secondary server $200_S$ returns a message that the new secondary copy relationship $300_S$ can be established, but delays performing the withdrawal until after the new primary copy relationship $300_P$ is established. After the new primary copy relationship $300_P$ is established, the secondary copy manager $212_S$ is signaled to perform a withdrawal if needed and if the withdrawal succeeds proceeds with establishing the new secondary copy relationship $300_S$.

FIG. 6 illustrates an embodiment of operations performed by the copy manager $212_P$, $212_S$ to withdraw tracks in a new copy relationship $300_N$ to establish from a pre-existing copy relationship $300_{Pr}$ on the primary $200_P$ or secondary $200_S$ server, such as performed at block 534 528 (FIG. 5) by the target copy manager 212T. Upon initiating (at block 600) an operation to withdraw data for a new copy relationship $300_N$ from a pre-existing copy relationship $300_{Pr}$ on a storage server (primary $200_P$ or secondary $200_S$), the primary $212_P$ or secondary $212_S$ copy manager determines (at block 602) whether the data units, e.g., tracks, in the new primary or secondary copy relationship $300_P$. $300_S$ are at beginning or end of range of tracks of pre-existing copy relationship $300_{Pr}$. If (at block 602) the data units in new copy relationship $300_N$ are at the beginning or end of the pre-existing range of data units, then the data units in the new copy relationship $300_N$ are removed (at block 604) from the pre-existing range of data units in the pre-existing copy relationship $300_{Pr}$. If (at block 602) the tracks in the new primary or secondary copy relationship $300_P$. $300_S$ are not at the beginning or end of pre-existing range of data units of pre-existing copy relationship $300_P$, but embedded within the pre-existing range of data units of the pre-existing copy relationship $300_{Pr}$, then the primary $212_P$ or secondary $212_S$ copy manager splits (at block 606) the pre-existing copy relationship $300_{Pr}$ into a first pre-existing copy relationship $300_{P1}$ having a first range of data units from a first data unit in the pre-existing range of data units of the pre-existing copy relationship $300_{Pr}$ to a data unit in the pre-existing range prior to a first data unit of the data units in the new copy relationship $300_N$ and a second pre-existing copy relationship $300_{P2}$ having a second range of data units extending from a data unit following a last data unit of data units in the new copy relationship $300_N$ to a last data unit in the pre-existing range of data units in the pre-existing copy relationship $300_{Pr}$. The initial pre-existing copy relationship $300_N$ is deleted (at block 608), leaving the first $300_{P1}$ and second $300_{P2}$ pre-existing copy relationships without any of the primary or secondary data units in the new copy relationship $300_N$.

With the embodiment of FIG. 6, data units included in a new copy relationship to establish are withdrawn from a pre-existing copy relationship to allow the establish of the new copy relationship to automatically continue without having to manually withdraw the data units or contact support.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code 701 involved in performing the inventive methods, such as primary server components 745 and secondary server components 746, comprising the server 200 components shown in FIG. 2. The host 106 may be implemented in the end user device 703, the primary server 200$_P$ may be implemented in computer 700$_P$, and the secondary server 200$_S$ may be implemented in computer 700$_S$, which includes all the components shown with respect to computer 700$_P$. These computers 700$_P$, 700$_S$, and the end user device 703 communicate over WAN 702.

In addition to block 701, computing environment 700 includes, for example, computer 700$_P$, 700$_S$, wide area network (WAN) 702, end user device (EUD) 703, remote server 704, public cloud 705, and private cloud 706. In this embodiment, computer 701$_P$ includes processor set 710 (including processing circuitry 720 and cache 721), communication fabric 711, volatile memory 712, persistent storage 713 (including operating system 722 and block 701, as identified above), peripheral device set 714 (including user interface (UI) device set 723, storage 724, and Internet of Things (IOT) sensor set 725), and network module 715. Remote server 704 includes remote database 730. Public cloud 705 includes gateway 740, cloud orchestration module 741, host physical machine set 742, virtual machine set 743, and container set 744.

Figure 7:
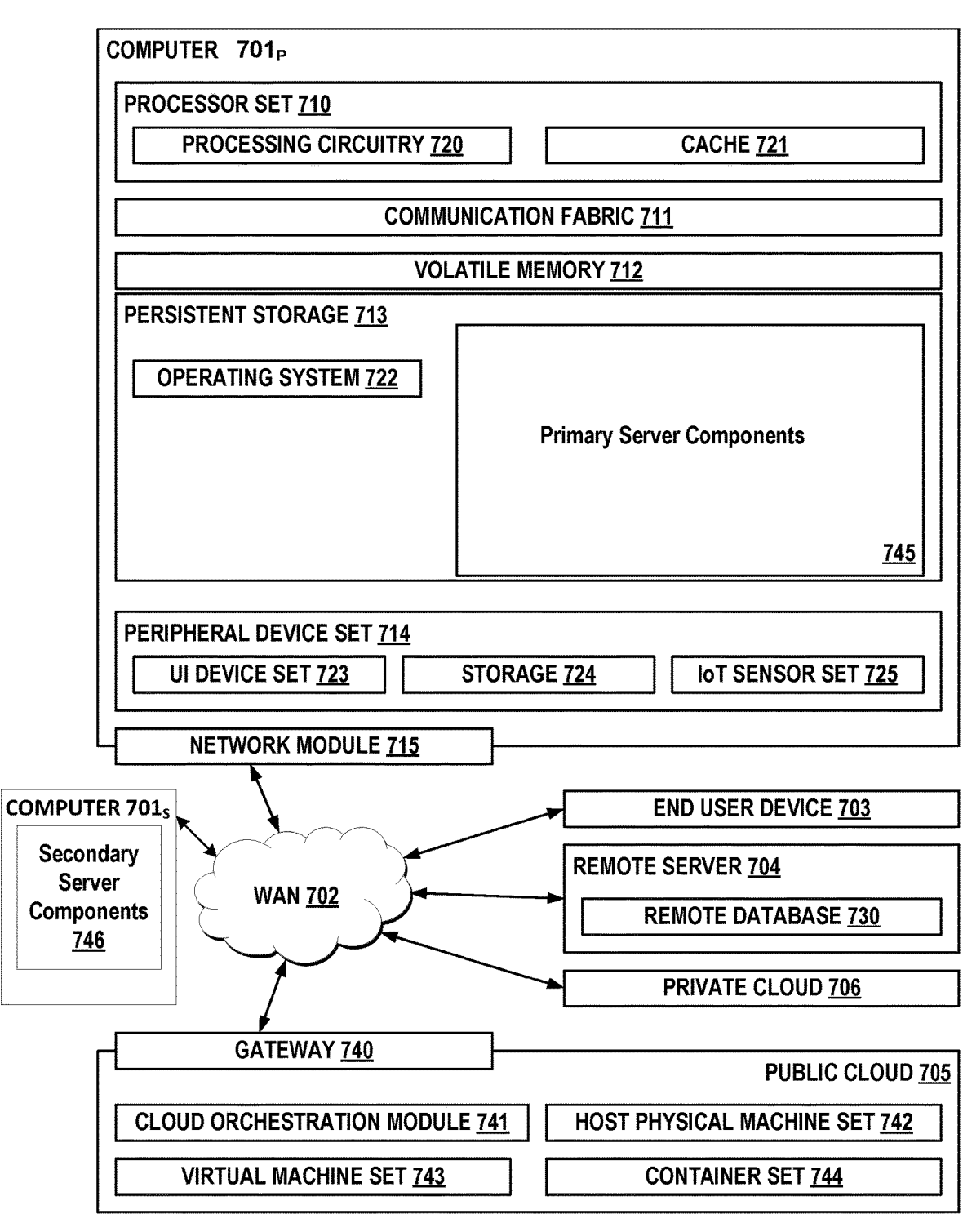
FIG. 7 illustrates a computing environment in which the components of FIGS. 1 and 2 may be implemented.

COMPUTER 700$_P$, 700$_S$, and end user device 703 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 700$_P$, to keep the presentation as simple as possible. Computer 700$_P$, 700$_S$ may be located in a cloud, even though it is not shown in a cloud in FIG. 7. On the other hand, computer 700$_P$, 700$_S$ is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 700$_P$. 700$_S$ to cause a series of operational steps to be performed by processor set 710 of computer 700$_P$, 700$_S$ and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in persistent storage 713.

COMMUNICATION FABRIC 711 is the signal conduction path that allows the various components of computer 700$_P$, 700$_S$ to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 700$_P$, 700$_S$, the volatile memory 712 is located in a single package and is internal to computer 700$_P$, 700$_S$, but, alternatively or additionally, the volatile memory may be distributed over multiple packages and/or located externally with respect to computer 700$_P$, 700$_S$.

PERSISTENT STORAGE 713 is any form of non-volatile storage for computers that is now known or to be developed in the future. The non-volatility of this storage means that the stored data is maintained regardless of whether power is being supplied to computer $700_P$, $700_S$ and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 701 typically includes at least some of the computer code involved in performing the inventive methods.

PERIPHERAL DEVICE SET 714 includes the set of peripheral devices of computer $701_P$, $701_S$. Data communication connections between the peripheral devices and the other components of computer $700_P$, $700_S$ may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer $700_P$, $700_S$ is required to have a large amount of storage (for example, where computer $700_P$, $700_S$ locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computers $700_P$, $700_S$ to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer $701_P$, $701_S$ from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer $700_P$, and may take any of the forms discussed above in connection with computer $700_P$. EUD 703 typically receives helpful and useful data from the operations of computer $700_P$. For example, in a hypothetical case where computer $700_P$ is designed to provide a recommendation to an end user, this recommendation would typically be communicated from network module 715 of computer $700_P$ through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer $700_P$, $700_S$. Remote server 704 may be controlled and used by the same entity that operates computer $701_P$, $701_S$. Remote server 704 represents the machine(s) that collect and store helpful and useful data for use by other computers, such as computer $700_P$, $700_S$. For example, in a hypothetical case where computer $700_P$. $700_S$ is designed and programmed to provide a recommendation based on historical data, then this historical data may be provided to computer $700_P$, $700_S$ from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for establishing copy relationships for primary storage and secondary storage, wherein the computer program product comprises a computer readable storage medium having program instructions embodied therewith, the program instructions executable by a processor to cause operations, the operations comprising:
   receiving a command to establish a primary copy relationship of primary source data in the primary storage to copy to primary target data in the primary storage and a secondary copy relationship of secondary source data in the secondary storage to copy to secondary target data in the secondary storage;
   establishing the primary copy relationship for the primary storage in response to receiving the command;
   in response to receiving the command, determining whether a part of the secondary target data in a pre-existing copy relationship at the secondary storage can be withdrawn from the pre-existing copy relationship; and
   in response to determining that the part of the secondary target data in the pre-existing copy relationship can be withdrawn, establishing the secondary copy relationship for the secondary storage.

2. The computer program product of claim 1, wherein the establishing the secondary copy relationship for the secondary storage is performed in response to receiving a message that the primary copy relationship was established for the primary storage.

3. The computer program product of claim 1, wherein the operations further comprise:
   determining that there is no pre-existing copy relationship including a part of the secondary target data; and
   in response to determining there is no pre-existing copy relationship, performing:
      establishing the primary copy relationship for the primary storage; and
      establishing the secondary copy relationship for the secondary storage.

4. The computer program product of claim 1, wherein the determining that the part of the secondary target data can be withdrawn from the pre-existing copy relationship comprises determining one of that the part of the secondary target data does not comprise both source and target data in a cascaded copy relationship and that the pre-existing copy relationship is not for an incremental copy.

5. The computer program product of claim 1, wherein the pre-existing copy relationship comprises a pre-existing copy relationship, and wherein the operations further comprise:
   determining whether at least one of the primary source data and the primary target data are capable of being withdrawn from at least one primary pre-existing copy relationship in response to determining that the primary source data and the primary target data need to be withdrawn from the at least one primary pre-existing copy relationship to establish the primary copy relationship, wherein the determining whether the part of the secondary target data can be withdrawn from the pre-existing copy relationship is performed after determining that the at least one of the primary source data and the primary target data are capable of being withdrawn.

6. The computer program product of claim 1, wherein the operations further comprise:

sending a command to establish the secondary copy relationship in response to successfully completing establishing the primary copy relationship; and withdrawing the part of the secondary target data from the pre-existing copy relationship in response to receiving the command to establish the secondary copy relationship, wherein the establishing the secondary copy relationship is performed after successfully withdrawing the part of the secondary target data from the pre-existing copy relationship.

7. The computer program product of claim 1, wherein the operations further comprise:

withdrawing at least one of the secondary target data in the secondary copy relationship from the pre-existing copy relationship by performing:

removing the part of the secondary target data from the pre-existing copy relationship in response to the part of the secondary target data being at a beginning or an end of a range of target data in the pre-existing copy relationship; and in response to the part of the secondary target data being within the range of target data in the pre-existing copy relationship and not at the beginning or the end of the range of the target data, splitting the pre-existing copy relationship into a first pre-existing relationship including data from a beginning of the range of the target data to data prior to a beginning of the part of the secondary target data in the range of the target data and into a second pre-existing relationship including data in the range of the target data following the part of the secondary target data in the range of the target data to an end of the range of the target data.

8. The computer program product of claim 1, wherein the primary copy relationship and the secondary copy relationship comprise point-in-time copy relationships, wherein the operations further comprise:

maintaining a first mirror copy relationship to mirror the primary source data in the primary storage to the secondary source data in the secondary storage; and maintaining a second mirror copy relationship to mirror the primary target data in the primary storage to the secondary target data in the secondary storage.

9. A system for establishing copy relationships for primary storage and secondary storage, comprising:

a primary server coupled to the primary storage;

a secondary server coupled to the secondary storage and in communication with the primary server;

wherein the primary server performs operations, the operations comprising:

receiving a command to establish a primary copy relationship of primary source data in the primary storage to copy to primary target data in the primary storage and a secondary copy relationship of secondary source data in the secondary storage to copy to secondary target data in the secondary storage;

establishing the primary copy relationship for the primary storage in response to receiving the command;

in response to receiving the command, determining whether a part of the secondary target data in a pre-existing copy relationship at the secondary storage can be withdrawn from the pre-existing copy relationship; and in response to determining that the part of the secondary target data in the pre-existing copy relationship can be withdrawn, establishing, by the secondary server, the secondary copy relationship for the secondary storage.

10. The system of claim 9, wherein the establishing the secondary copy relationship for the secondary storage is performed by the secondary server in response to receiving a message that the primary copy relationship was established for the primary storage.

11. The system of claim 9, wherein the operations further comprise:

determining, by the primary server, that there is no pre-existing copy relationship including a part of the secondary target data; and in response to determining there is no pre-existing copy relationship, performing:

establishing, by the primary server, the primary copy relationship for the primary storage; and establishing, by the secondary server, the secondary copy relationship for the secondary storage.

12. The system of claim 9, wherein the determining that the part of the secondary target data can be withdrawn from the pre-existing copy relationship comprises the secondary server determining one of that the part of the secondary target data does not comprise both source and target data in a cascaded copy relationship and that the pre-existing copy relationship is not for an incremental copy.

13. The system of claim 9, wherein the pre-existing copy relationship comprises a pre-existing copy relationship, and wherein the operations further comprise:

determining, by the primary server, whether at least one of the primary source data and the primary target data are capable of being withdrawn from at least one primary pre-existing copy relationship in response to determining that the primary source data and the primary target data need to be withdrawn from the at least one primary pre-existing copy relationship to establish the primary copy relationship, wherein the determining whether the part of the secondary target data can be withdrawn from the pre-existing copy relationship is performed, by the secondary server, after determining that the at least one of the primary source data and the primary target data are capable of being withdrawn.

14. The system of claim 9, wherein the operations further comprise:

sending, by the primary server, a command to the secondary server to establish the secondary copy relationship in response to successfully completing establishing the primary copy relationship; and withdrawing, by the secondary server, the part of the secondary target data from the pre-existing copy relationship in response to receiving the command to establish the secondary copy relationship, wherein the establishing the secondary copy relationship is performed after successfully withdrawing the part of the secondary target data from the pre-existing copy relationship.

15. A method for establishing copy relationships for primary storage and secondary storage, comprising:

receiving a command to establish a primary copy relationship of primary source data in the primary storage to copy to primary target data in the primary storage and a secondary copy relationship of secondary source data in the secondary storage to copy to secondary target data in the secondary storage;

establishing the primary copy relationship for the primary storage in response to receiving the command;

in response to receiving the command, determining whether a part of the secondary target data in a pre-existing copy relationship at the secondary storage can be withdrawn from the pre-existing copy relationship; and in response to determining that the part of the secondary target data in the pre-existing copy relationship can be withdrawn, performing: establishing the primary copy relationship for the primary storage; and establishing the secondary copy relationship for the secondary storage.

16. The method of claim 15, wherein the establishing the secondary copy relationship for the secondary storage is performed in response to receiving a message that the primary copy relationship was established for the primary storage.

17. The method of claim 15, further comprising:

determining that there is no pre-existing copy relationship including a part of the secondary target data; and in response to determining there is no pre-existing copy relationship, performing:

establishing the primary copy relationship for the primary storage; and establishing the secondary copy relationship for the secondary storage.

18. The method of claim 15, wherein the determining that the part of the secondary target data can be withdrawn from the pre-existing copy relationship comprises determining one of that the part of the secondary target data does not comprise both source and target data in a cascaded copy relationship and that the pre-existing copy relationship is not for an incremental copy.

19. The method of claim 15, wherein the pre-existing copy relationship comprises a pre-existing copy relationship, further comprising:

determining whether at least one of the primary source data and the primary target data are capable of being withdrawn from at least one primary pre-existing copy relationship in response to determining that the primary source data and the primary target data need to be withdrawn from the at least one primary pre-existing copy relationship to establish the primary copy relationship, wherein the determining whether the part of the secondary target data can be withdrawn from the pre-existing copy relationship is performed after determining that the at least one of the primary source data and the primary target data are capable of being withdrawn if necessary.

20. The method of claim 15, further comprising:

sending a command to establish the secondary copy relationship in response to successfully completing establishing the primary copy relationship; and withdrawing the part of the secondary target data from the pre-existing copy relationship in response to receiving the command to establish the secondary copy relationship, wherein the establishing the secondary copy relationship is performed after successfully withdrawing the part of the secondary target data from the pre-existing copy relationship.

* * * * *